United States Patent [19]
Graham

[11] 3,971,307
[45] July 27, 1976

[54] DEEP FAT FRYER
[75] Inventor: Glenn N. Graham, Cheyenne, Wyo.
[73] Assignee: Wyott Corporation, Cheyenne, Wyo.
[22] Filed: Aug. 14, 1975
[21] Appl. No.: 604,847

[52] U.S. Cl. .................................. 99/403; 219/432; 219/437
[51] Int. Cl.² .......................................... A47J 37/12
[58] Field of Search ...................... 99/403, 330–331, 99/345, 355, 359, 407, 410, 413; 219/432, 437, 523

[56] References Cited
UNITED STATES PATENTS

| | | | |
|---|---|---|---|
| 1,994,909 | 3/1935 | Ehrgott | 99/413 X |
| 2,756,425 | 7/1956 | Webber | 219/437 X |
| 2,805,314 | 9/1957 | Michaelis | 219/437 |
| 3,121,783 | 2/1964 | Blanchard | 99/331 X |
| 3,870,859 | 3/1975 | Price | 219/437 |
| 3,911,250 | 10/1975 | Price | 219/437 X |

*Primary Examiner*—Billy J. Wilhite
*Assistant Examiner*—Arthur O. Henderson
*Attorney, Agent, or Firm*—Edwin L. Spangler, Jr.

[57] ABSTRACT

This invention relates to a deep fat fryer characterized by a front-mounted control panel spanning the gap between the forwardly-extending arms of a generally H-shaped tubular frame shielding the electrical conductors that cooperates with the latter to define an open-topped hinged lid for the fat reservoir.

12 Claims, 7 Drawing Figures

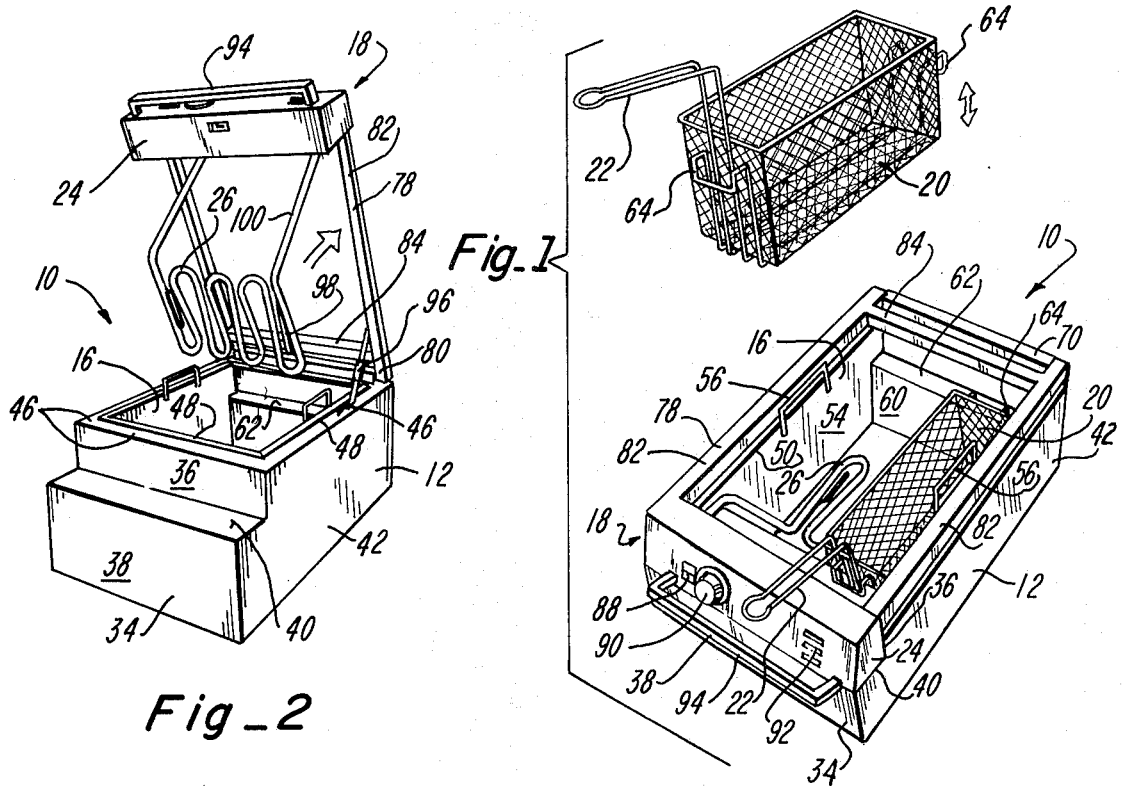
Fig_1
Fig_2
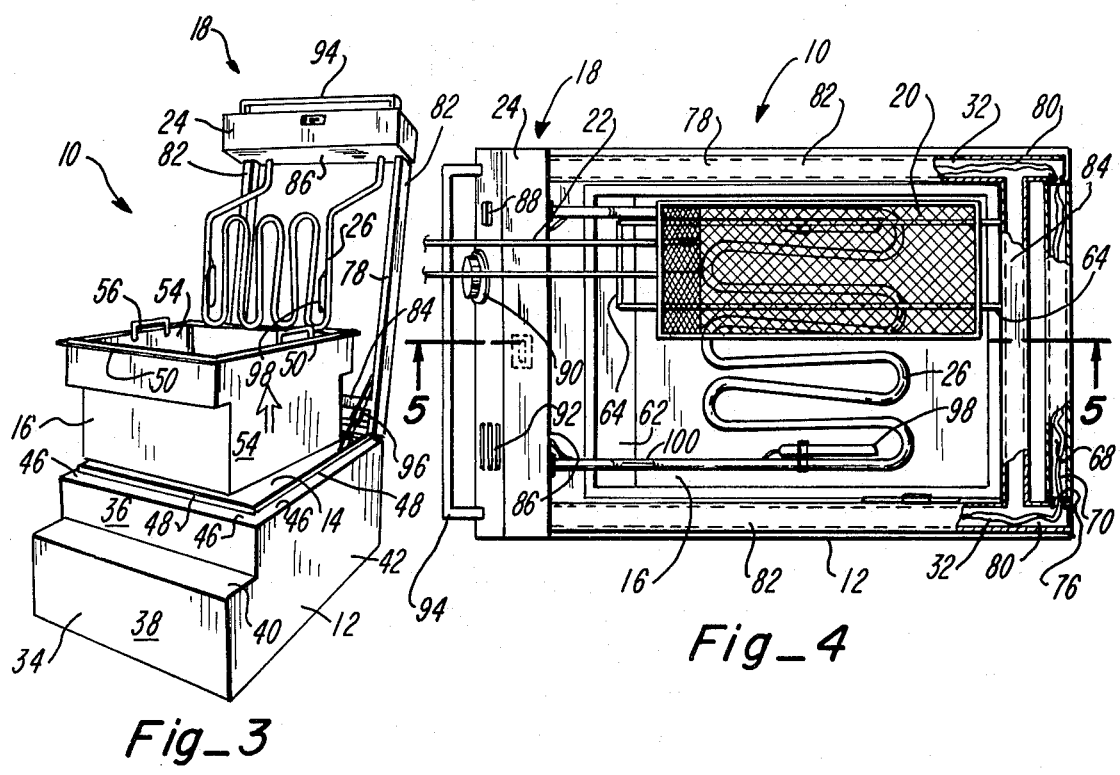
Fig_3
Fig_4

U.S. Patent July 27, 1976 Sheet 2 of 2 3,971,307
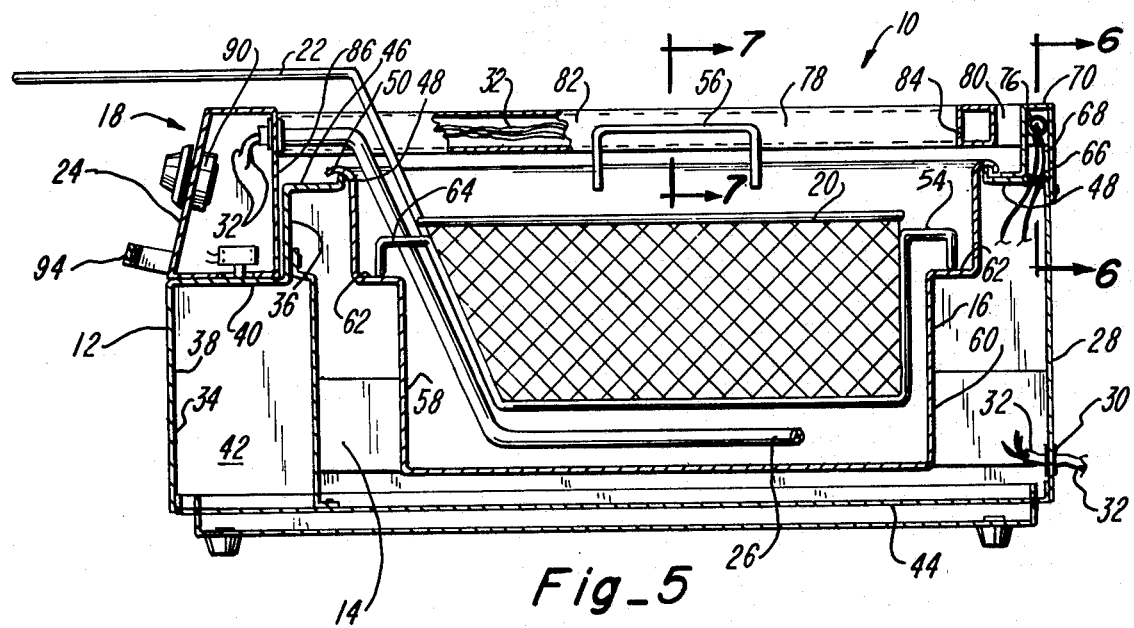
Fig_5
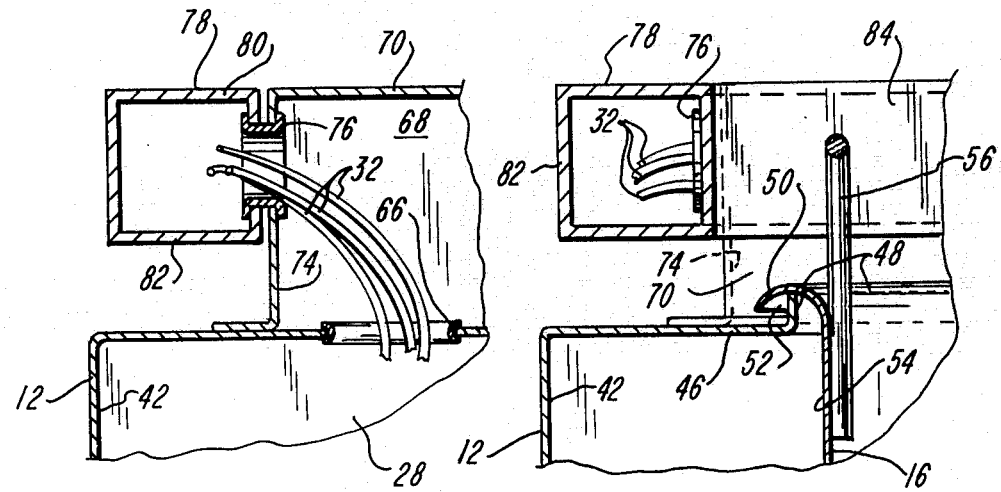
Fig_6   Fig_7

DEEP FAT FRYER

Deep fat fryers are common equipment in most restaurants and they usually include an open-topped box of some type, a removable cooking oil reservoir that sits inside the box, one or more wire baskets with handles on them that are filled with food to be fried and immersed in the hot cooking oil and a thermostatically-controlled immersible heater hingedly or otherwise attached to the box so that it can be raised out of the way and the reservoir removed for cleaning which needs to be done at frequent intervals. The wire baskets, of course, must be readily removable from the reservoir as they must be emptied each time the food contained in them becomes cooked.

Hot cooking oil is an extremely hazardous substance and, without a doubt, one of the major causes of restaurant fires. Not only does it catch on fire easily but, in addition, it spatters badly and causes painful burns to those working around and over it. While not particularly hazardous, another problem is that of smoke occasioned by the grease getting too hot. The net result is that careful control should be maintained over the temperature of the cooking oil and this would be most safely accomplished by having the thermostat on the front of the unit where the user was not required to reach across the hot cooking oil bath at the considerable risk of being spattered and scalded. In fact, this practice is so dangerous and conducive to injury that Government standards require that the manufacturers mount the controls on the front of the unit.

Unfortunately, these safety requirements are totally incompatible with the frequent need to lift the heating element from the reservoir preparatory to removing the latter for cleaning since this element, of necessity, must be attached in some fashion to a source of electrical energy that is generally only accessible within the control panel. The result of all this is to ignore the Government requirements and mount the control panel at the rear of the unit where the heating element can be attached and more easily removed to gain access to the reservoir.

It has now been found in accordance with the teaching of the instant invention that these and other shortcomings of the prior art deep fat fryers can, in fact, be overcome by the simple, yet unobvious, expedient of running the electrical leads from a source of power at the rear of the unit forwardly through the hollow parallel arms of a generally H-shaped frame to a control panel extending across the front that cooperates therewith to produce an open-topped hinged lid from which the heating element is suspended and supported within the hot cooking oil in the reservoir. The electrical leads thus housed are shielded to a degree where they present no problem. The baskets are fully accessible to the same extent they are in a conventional fryer having a rear-mounted control panel. Most important, however, is the fact that all the controls are accessible to the user without having to reach across the top of the hot cooking oil in the reservoir. To clean the unit, one need only remove the baskets and raise the lid to gain immediate access to the reservoir which can then be removed and serviced as necessary. Minimal bending of the conductors takes place when the lid is actuated which, of course, also contributes to the overall safety of the unit.

It is, therefore, the principal object of the present invention to provide a novel and improved deep fat fryer.

A second objective is the provision of a device of the character described which alleviates the necessity for reaching across the hot cooking oil to reach the control panel.

Another object is to provide a french cooker which has a front-mounted control panel.

Still another objective is the provision of a device of the type herein disclosed and claimed that houses and protects the electrical leads in a tubular frame to which the control panel is attached.

An additional object is to provide a deep fat fryer where the open-topped hinged lid can be raised to gain access to the oil reservoir with minimal bending of the electrical leads.

Further objects are to provide a deep fat cooker which is safe, easy to use, simple to clean and service, rugged, dependable, compact, efficient and even decorative in appearance.

Other objects will be in part apparent and in part pointed out specifically hereinafter in connection with the description of the drawings that follows, and in which:

FIG. 1 is a fragmentary exploded perspective view illustrating how the wire baskets are removed and replaced in the fryer without having to raise the lid;

FIG. 2 is a perspective view similar to FIG. 1 and to the same scale showing the fryer with the baskets removed and the lid partially raised;

FIG. 3 is a perspective view similar to FIGS. 1 and 2 and to the same scale showing the lid fully raised and the cooking oil reservoir being removed from its well in the box;

FIG. 4 is a top plan view to a slightly enlarged scale, portions of which have been broken away and shown in section;

FIG. 5 is a longitudinal section taken along line 5—5 of FIG. 4;

FIG. 6 is a fragmentary section to a still further enlarged scale taken along 6—6 of FIG. 5; and, FIG. 7 is a fragmentary section to the same scale as FIG. 6 taken along line 7—7 of FIG. 5.

Referring next to the drawings for a detailed description of the present invention and, initially, to FIGS. 1-5, inclusive, for this purpose, reference numeral 10 has been chosen to indicate the deep fat fryer in a general way and it will be seen to include an open-topped box 12 defining a well or sink 14 in the interior thereof within which is disposed a removable reservoir 16 for the hot cooking oil. A hinged lid subassembly indicated in a general way by numeral 18 is hingedly attached to the rear edge of the box and is movable from the fully closed operative position of FIGS. 1, 4 and 5 to the partially or fully open inoperative positions shown in FIGS. 2 and 3, respectively. A pair of wire baskets 20 have handles 22 that extend out forwardly over the control box 24 that forms part of the lid subassembly 18. These baskts hold the food being cooked immersed in the hot cooking oil heated in the reservoir by submersible heating element 26 that also forms a part of the lid subassembly.

The box 12 has a rear end wall 28 with a grommet-encircled opening 30 therein through which the power cord 32 enters the unit as is most clearly revealed in FIG. 5 which will now be referred to. The front endwall 34 includes a rearwardly-offset upper portion 36 joined to the lower portion 38 by a horizontally-disposed step 40 atop which the control panel 24 rests in the fully closed position of the lid subassembly. The sidewalls 42 together with the bottom panel 44 (FIG. 5) complete the basic open-topped box 12.

The front and rear underwalls and sidewalls are each provided with an inturned flange 46 that terminates along its free edge in an upturned lip 48 which features are most clearly revealed in FIGS. 2–7, inclusive, to which detailed reference will now be made. These inturned flanges cooperate with one another to define a coplanar ledge bordered by the upturned lips 48 which support the reservoir 16 and hold same in spaced relation above the bottom 44 of the box 12. The upper edge of the reservoir 16 is bordered on all sides by an outturned rim 50 which is preferably curved over the lips 46 on which it rests as revealed most clearly in FIG. 7. Since drippings from the wire basket as well as the fried foods contained therein are bound to fall on the lid subassembly 18 and the box 12 whenever a basket is removed, the upturned lips 48 and marginal rim 50 cooperate with one another to define a gutter (FIG. 7) effective to prevent the cooking oil from entering the space between the box and reservoir where it becomes much more difficult to remove.

In FIGS. 1–5, it can be seen that sidewalls 54 of the reservoir are equipped with bail-type handles 56 for use in lifting it free of the box 12 even when full of hot cooking oil. This operation is accomplished with the baskets removed and the lid subassembly in the raised position of FIG. 3 as will be explained in greater detail presently. The front and rear endwalls 58 and 60 of the reservoir both include offsets like that of the front box wall 34 to provide steps or upturned ledges 62 atop which the hangers 64 on the baskets rest and support the latter in spaced relation above the heating element 26 as can be seen most clearly in FIG. 5.

Now, the most important feature of the instant invention is hinged lid subassembly 18 which will now be described in detail by referring to all the Figures of the drawing, each of which shows significant details thereof. The powercord 32 after passing through the rear endwall 28 of the box 12 passes on up through a second grommet-encircled opening 66 in inturned flange 46 (FIG. 6) into a transversely-extending compartment 68 disposed along the upper rear edge of the box 12 that is formed within a small sheet metal housing 70 shaped for this purpose. This housing is suitably fastened atop the flange 46 near endwall 28 and its endwalls 74 are provided with flanged collars 76 that define pivots through which the power cord enters the arms of H-shaped tubular frame 78 that comprises an important part of the lid subassembly 18. These collars 76 are arranged co-axially and they fasten the rearwardly-extending portions 80 of the parallel legs 82 to the endwalls 74 of housing 70 for hinged movement between the open positions of FIGS. 2 and 3 and the closed position of FIGS. 1, 4 and 5.

The crossbar 84 of the H-shaped frame 78 parallels the housing 70 in spaced relation in front of the latter and cooperates therewith and with the control box 24 to rigidify the lid subassembly. The legs 82 of the lid subassembly run along the side edges of the box 12 and outside the reservoir handles as shown until they connect into the rear panel 86 of the control box. In so doing, these tubular legs both house and protect the conductors of the power cord from spattering cooking oil, heat, abrasion and other damage. Once inside the control box, these leads are wired to the various controls including an on-off switch 88, thermostatic control 90, and indicator lights 92 that control operation of the unit in the conventional manner and which require no detailed explanation. These controls, of course, regulate the temperature of heating element 26 that is also fastened into the rear panel 86 of the control box where it is connected to the electrical leads. This heating element passes down into the reservoir between it and the sloping front wall of the baskets and then along the bottom of the reservoir where it remains immersed in the cooking oil and functions to heat same.

Now, with reference to FIGS. 1, 2 and 3, it will be seen that in order to clean the reservoir and replace the cooking oil therein, the first step is to remove both wire baskets as shown in FIG. 1. The next step is to grasp the lid subassembly 18 by the handle 94 on the front of the control box and raise the lid as shown in FIG. 2. Ordinary folding hinges 96 maintain the lid subassembly in fully open position. Finally, as shown in FIG. 3, the reservoir can be lifted out of its well in box 12, emptied and cleaned along with other elements of the apparatus.

With the controls fully accessible to the operator on the front of the unit, no necessity exists for reaching over the hot cooking oil as is the case with most, if not all, existing deep fat fryers. The leads to the controls are all incased in steel housings once they enter the unit, moreover, they are subject to only minimal twisting as the lid subassembly is raised and lowered atop the box. Even the heat sensor 98 and its capillary tubing 100 that connect it to the thermostatic control 90 are not subject to any flexion whatsoever as they move as a unit with the heating element and other components of the lid subassembly.

What is claimed is:

1. The deep fat fryer which comprises: a generally rectangular box having front and rear endwalls and sidewalls cooperating with one another to define an open-topped well; an open-topped reservoir for cooking oil removably mounted within the well in the box; an open-topped lid subassembly hingedly attached to the box for movement between a closed position atop thereof and an open position raised to a height that will permit removal of the reservoir from the well in the box, said lid subassembly including a pair of hollow arms pivotally attached at their rear ends to the upper outside corners of the rear endwall of the box and extending forwardly therefrom along the sidewalls of the latter to its front endwall, a housing connected to the front ends of the arms extending transversely therebetween along the front endwall of the box atop which it rests in the closed position of said lid subassembly, an electrically-powered heating element connected to the housing and projecting therefrom down along the front wall of the reservoir and along the bottom thereof, and control means mounted on the front of the housing and connected to the heating element operation to actuate the latter and regulate the temperature thereof; and, means comprising a power cord connectable to a source of electrical energy entering the rear endwall of the box and passing therefrom in heat-shielded rotation to the control means at the front of the lid subassembly through the hollow arms thereof.

2. The deep fat fryer as set forth in claim 1 which includes: at least one wire basket is removably mounted within the open-topped cooking oil reservoir.

3. The deep fat fryer as set forth in claim 2 in which: the basket has a handle extending upwardly between the arms and forwardly across the top of the housing of the lid subassembly when the latter is in closed position.

4. The deep fat fryer as set forth in claim 2 in which: the reservoir is generally rectangular and includes front and rear endwalls with steps formed therein intermediate the top and bottom edges thereof; and, in which the basket is provided with support means projecting from the front and rear ends thereof positioned and adapted to rest atop the steps in the reservoir endwalls and support the bottom of the basket in spaced relation above the heating element extending along the bottom of the latter.

5. The deep fat fryer as set forth in claim 1 in which: a hollow pivot member forms the pivotal connection between at least one arm of the lid subassembly and the rear endwall of the box; and, in which the power cord passes from said rear endwall into the lid subassembly through said hollow pivot member.

6. The deep fat fryer as set forth in claim 1 in which: the front endwall of the box has the upper portion thereof recessed to define a step-cut ledge; and, in which the housing of the lid subassembly rests atop said ledge in closed position.

7. The deep fat fryer as set forth in claim 6 in which: the lower edge of the housing lies essentially flush in relation to the front edge of the ledge on the front endwall of the box when the lid subassembly is closed.

8. The deep fat fryer as set forth in claim 1 in which: a transversely-extending brace interconnects the arms of the lid subassembly intermediate the ends thereof to define a generally H-shaped subframe.

9. The deep fat fryer as set forth in claim 8 in which: the brace is located adjacent the rear ends of the arms in position to lie across the rear end of the reservoir and prevent removal of the latter with the lid subassembly closed.

10. The deep fat fryer as set forth in claim 1 in which: the interior of the well in the box is bordered by an upwardly-facing ledge terminating along its inner margin in an upturned lip; and, in which the upper marginal edge of the reservoir is curled outwardly to form a downwardly-concave flange positioned to receive the lip bordering the ledge and cooperate therewith to define a gutter effective to prevent cooking oil dripped on said ledge from entering the well with said reservoir in place.

11. The deep fat fryer as set forth in claim 10 in which: the ledge comprises inturned flanges extending along the top edges of the sidewalls and endwalls of the box.

12. The deep fat fryer as set forth in claim 1 in which: a foldable strut interconnects the lid subassembly and box, said strut being operative when unfolded to maintain said lid subassembly in open position while the reservoir is removed from the well in the box.

* * * * *